(12) United States Patent
Irvine et al.

(10) Patent No.: US 8,671,211 B2
(45) Date of Patent: Mar. 11, 2014

(54) METHOD AND SYSTEM FOR DISTRIBUTING CONTENT

(75) Inventors: Samuel V. Irvine, Long Beach, CA (US); Vlad Zarney, Calabasas, CA (US); Titus Winters, New York, NY (US); Romulo Pontual, Hermosa Beach, CA (US); Mark C. Guidarelli, Sherman Oaks, CA (US); Noreen Fong, Cerritos, CA (US); Raynold M. Kahn, Los Angeles, CA (US); Luke J. Crook, San Pedro, CA (US); Gregory Vagnati, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 563 days.

(21) Appl. No.: 12/881,043

(22) Filed: Sep. 13, 2010

(65) Prior Publication Data

US 2011/0066679 A1    Mar. 17, 2011

Related U.S. Application Data (60) Provisional application No. 61/242,345, filed on Sep. 14, 2009.

(51) Int. Cl.
 *G06F 15/16* (2006.01)
(52) U.S. Cl.
 USPC .............................. 709/231; 709/217; 709/247
(58) Field of Classification Search
 None
 See application file for complete search history.

(56) References Cited

U.S. PATENT DOCUMENTS

| 8,060,637 | B2 | 11/2011 | Kayanuma et al. | |
|---|---|---|---|---|
| 2004/0088729 | A1 | 5/2004 | Petrovic et al. | |
| 2004/0117845 | A1 | 6/2004 | Karaoguz et al. | |
| 2006/0291507 | A1 * | 12/2006 | Sarosi et al. | 370/493 |
| 2007/0005783 | A1 * | 1/2007 | Saint-Hillaire et al. | 709/230 |
| 2007/0053653 | A1 | 3/2007 | Huntington | |
| 2007/0104348 | A1 | 5/2007 | Cohen | |
| 2008/0077852 | A1 * | 3/2008 | Fleishman et al. | 715/234 |
| 2008/0120671 | A1 | 5/2008 | Sim et al. | |
| 2008/0120673 | A1 * | 5/2008 | Dong et al. | 725/118 |
| 2008/0178219 | A1 * | 7/2008 | Grannan | 725/41 |
| 2008/0320537 | A1 | 12/2008 | Rajakarunanayake | |

(Continued)

FOREIGN PATENT DOCUMENTS

EP      1259069 A1   11/2002
JP      09-065288    3/1997

(Continued)

OTHER PUBLICATIONS

Final Rejection dated Jan. 3, 2013 in U.S. Appl. No. 12/881,034, filed Sep. 13, 2010 by Samuel V. Irvine et al.

(Continued)

*Primary Examiner* — Patrice Winder (57) ABSTRACT

A system and method for controlling a communication system includes a local area network, a first client device and a first server device in communication with the first client device through the local area network. The first server device communicates an audio-visual stream and remote user interface data to the first client device through the local area network. The first client device renders a display using the audio-video stream and the remote user interface. The first client device generates a key command and communicates the key command to the first server device in response to the remote user interface data.

24 Claims, 8 Drawing Sheets

(56) References Cited

U.S. PATENT DOCUMENTS

| | | | |
|---|---|---|---|
| 2009/0100474 A1* | 4/2009 | Migos | 725/61 |
| 2009/0300693 A1 | 12/2009 | Herlein et al. | |
| 2010/0235528 A1* | 9/2010 | Bocharov et al. | 709/231 |
| 2010/0262986 A1 | 10/2010 | Adimatyam et al. | |
| 2010/0281142 A1 | 11/2010 | Stoyanov | |
| 2010/0299700 A1 | 11/2010 | Choi et al. | |
| 2011/0032424 A1 | 2/2011 | VanDuyn et al. | |

FOREIGN PATENT DOCUMENTS

| | | |
|---|---|---|
| JP | 10-133973 | 5/1998 |
| JP | 2005-033295 | 2/2005 |
| JP | 2006-332943 | 12/2006 |
| JP | 2007-241882 | 9/2007 |
| KR | 100729628 B1 | 6/2007 |
| WO | 98/59478 A1 | 12/1998 |
| WO | 2005/046156 A2 | 5/2005 |

OTHER PUBLICATIONS

Non-final Office action dated May 11, 2012 in U.S. Appl. No. 12/881,034, filed Sep. 13, 2010 by Samuel V. Irvine et al.

International Search Report and Written Opinion dated Nov. 10, 2010 in International Application No. PCT/US2010/048523 filed Sep. 10, 2010 by Samuel V. Irvine et al.

Takahashi, Tetsuya; "Part 2: Firewall Used in OCN"; LAN Times; Jun. 1997 issue (vol. 7, No. 6); Softbank Corporation; Jun. 1, 1997; pp. 48-51; partial translation.

Translated Japanese Office action dated Aug. 20, 2013 in Japanese Patent Application No. 2012-529807 filed Sep. 10, 2010 by Samuel V. Irvine et al.

Korean Office action dated Jul. 3, 2013 in Korean Patent Application No. 10-2012-7009637 filed Sep. 10, 2010 by Samuel V. Irvine et al.

* cited by examiner

METHOD AND SYSTEM FOR DISTRIBUTING CONTENT

CROSS-REFERENCE TO RELATED APPLICATIONS

This application claims the benefit of U.S. Provisional Application No. 61/242,345, filed on Sep. 14, 2009. The entire disclosure of the above application is incorporated herein by reference.

TECHNICAL FIELD

The present disclosure relates generally communicating between a server and a client device, and, more specifically, to providing content and controlling a remote user interface using the server device to the client device.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Electronic devices are increasingly accessing the Internet. In the newest flat panel televisions, Internet connections are provided to enhance the customer experience. For example, various Internet sources such as movie sources and data sources such as weather data and stock data may all be obtained directly from the Internet-connected device.

Because each electronic device receives the signals and also processes the signals, the customer experiences at each of the electronic devices may be slightly different. Consistency and the quality that the customer perceives at each device are important for providing a consistent customer experience.

SUMMARY

The present disclosure allows the use of simplified clients to provide a consistent customer experience at each display associated with a first client device.

In one aspect of the disclosure, a method includes communicating an audio-visual stream and a remote user interface to a first client device through a local area network, rendering a display using the audio-video stream and the remote user interface, generating a key command at the first client device and communicating the key command to the first server device in response to the remote user interface.

In a further aspect of the disclosure, a system for controlling a communication system includes a local area network, a first client device and a first server device in communication with the first client device through the local area network. The first server device communicates an audio-visual stream and a remote user interface to the first client device through the local area network. The first client device renders a display using the audio-video stream and the remote user interface. The first client device generates a key command and communicates the key command to the first server device in response to the remote user interface.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system. The communication system may be implemented in a terrestrial system such as a broadband system, cable system or telephone-type system. Optical fiber and wireless distribution may also be used in the broadband distribution system.

Further, many other types of content delivery systems are readily applicable to the disclosed systems and methods. For example, other wireless distribution systems, wired or cable distribution systems, cable television distribution systems, ultra-high frequency/very high frequency radio frequency systems, or other terrestrial broadcast systems may be used. Local multi-point distribution systems, Internet protocol-(IP) based distribution systems, cellular distribution systems, power-line broadcast systems, and point-to-point or multicast Internet protocol delivery networks may be used.

The following disclosure is made with respect to the delivery of video such as television, movies, music videos, and the like. It should also be understood that the systems and methods disclosed herein could also be used for the delivery of any media type, for example, audio, music, data, files, web pages, games, etc. Additionally, throughout this disclosure reference is made to data, information, program, movies, assets, video data, etc. However, it will be readily apparent that these terms are substantially equivalent in reference to the example systems and methods disclosed herein. Therefore, the present disclosure is applicable to the many types of content described above.

Figure 1:
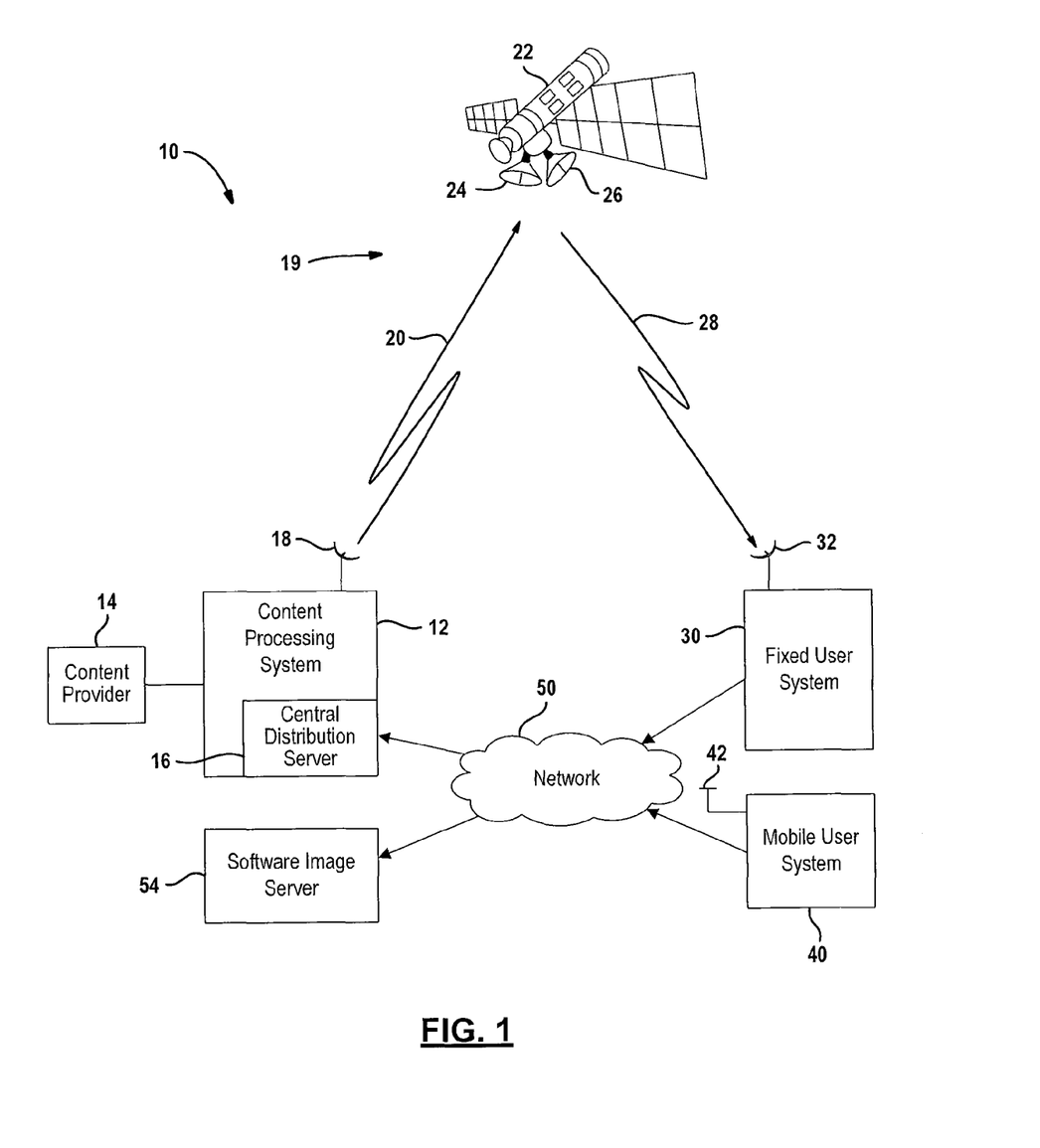
FIG. 1 is a high level block diagrammatic view of a satellite distribution system according to the present disclosure.

Referring now to FIG. 1, a communication system 10 is illustrated. Communication system 10 includes a content processing system 12 that is used as a processing and transmission source. A plurality of content providers 14, only one of which illustrated, may provide content to the content processing system 12. The content processing system 12 receives various types of content from a content provider 14 and communicates the content to system users. The content processing system 12 may also be associated with a central distribution server 16. The central distribution server 16 may be incorporated into the content processing system 12 or may be a separate item. The central distribution server 16 may be used for various types of distribution including resetting a user device, providing a software image or providing an updated software image to a user device. Other uses of the central distribution server 16 will be described below.

The content processing system 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the content processing system 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network. The network 50 may be a one-way network so that data or content may be communicated from the fixed user system 30 or the mobile user system 40 through the network 50 to the content processing system 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the content processing system 12, which includes the distribution server 16, and the fixed user system 30 and the mobile user system 40. The network 50 may also be in communication with the software image server 54. The software image server 54 may include memory for storing software images for the fixed user system 30 or the mobile user system 40. The software image server 54 may include boot software images or other software images. The software images may be initial software images or revised software images. The software images within the software image server 54 may also be different versions of software images. The fixed user system 30 and the mobile user system 40 use various data versions of software for testing. The software image server 54 may be incorporated into the content processing system 12 or a separate component or data site that may interconnect to the other parts of the system 10 through the network 50.

Figure 2:
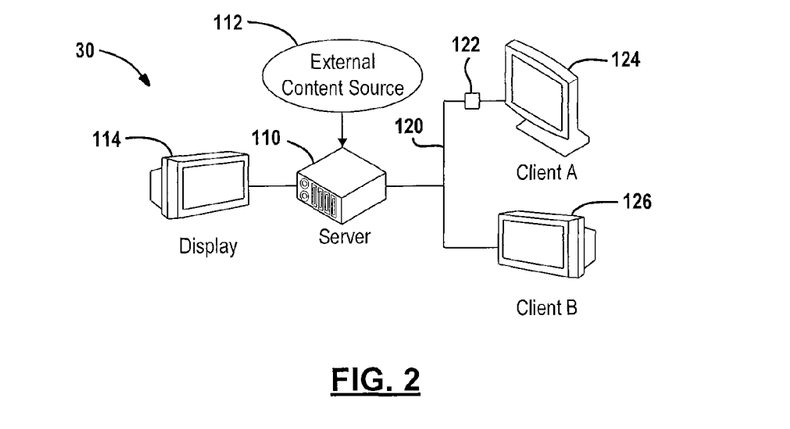
FIG. 2 is a block diagrammatic view of a first network topology.

Referring now to FIG. 2, an example of a fixed user system 30 is illustrated in further detail. The fixed user system 30 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1. The external source 112 may be a variety of television signal sources such as an over-the-air tuner, a cable, a wireless system, or an optical system. Various types of signals such as data, music, video, games, audio, and combinations thereof may be part of the external source.

The server device 110 may act as a set top box for directly communicating content to a display 114. The content in a direct connect may not be renderable content but rather directly displayable signals within a frequency band. The signals to display 114 may also be renderable. The display 114 may be a television or monitor.

The server 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server 110 acts to communicate to both clients A and B as well as acts as an intermediary if client A communicates with Client B, or vice versa.

The server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server for displaying the rendered signals on a display 124 associated with the client device 122. The client device 122 may also select the content and controls from the user interface and communicate the control signals to the server device 110.

A second client, Client B, may also be in communication with the server 110 through the local area network 120. Client B may contain an internal client device, not shown, for displaying rendered signals on the display 126. The internal client device may be functionally equivalent to the standalone client device 122. Because both the first client, Client A, and the second client, Client B, are in communication directly with the server 110, the network may be referred to as a closed network. Various numbers of clients may be connected to the local area network 120.

Figure 3:
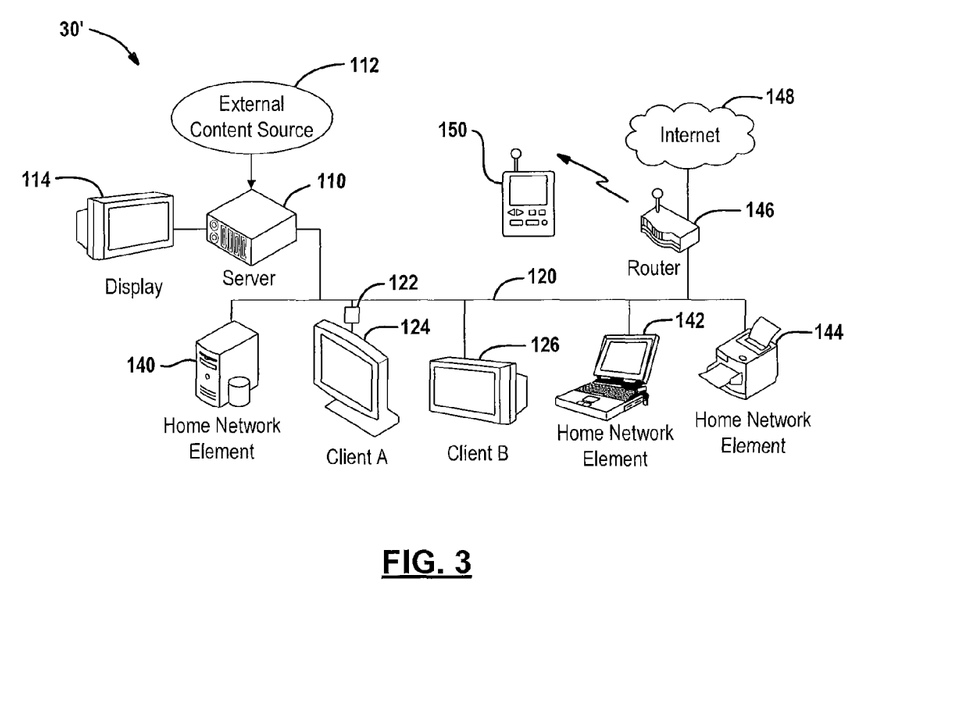
FIG. 3 is a block diagrammatic view of a second embodiment of the network topology.

Referring now to FIG. 3, a fixed user system 30' which is an open network is illustrated. In this example, the same components described above in FIG. 2 are provided with the same reference numerals. In this example, the local area network 120 may include a number of home network elements. One home network element may be a home network server 140 or other computing device. Another home network element may include a laptop computer 142 that is in communication with the local area network 120. Another home network element may include a network printer 144 and a router 146. The router 146 may communicate with other devices through an external network such as the Internet 148.

The fixed user system 30 may also have wireless elements associated therewith. The router 146 or another network device may generate wireless signals that allow a wireless device 150 to communicate with at least one server 110 or 140. The wireless device 150 may, for example, be a personal digital assistant, a cellular phone, a personal media device or a Blu-Ray or DVD player. Of course, other wireless devices may be part of the network.

Figure 4:
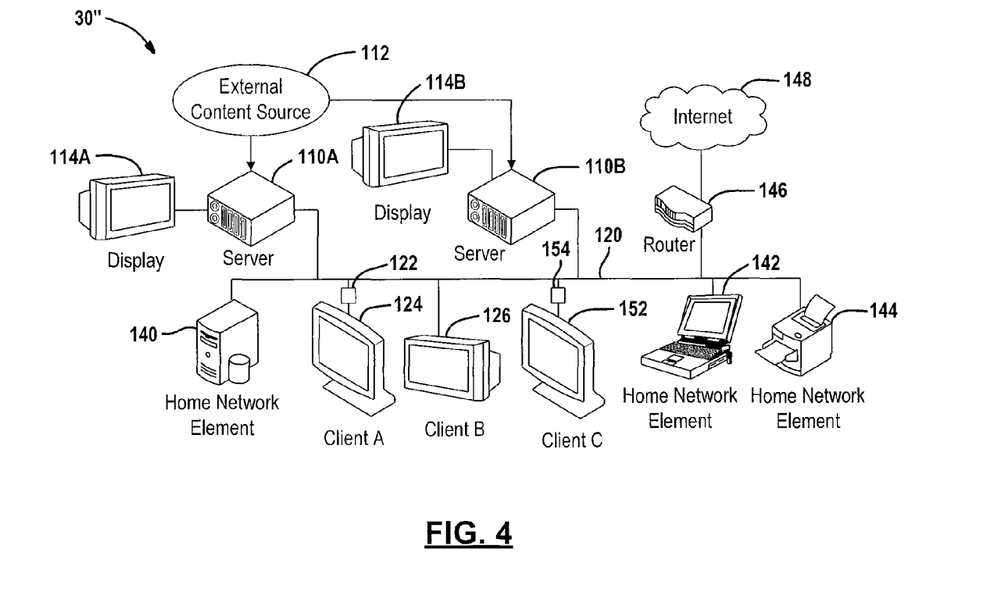
FIG. 4 is a block diagrammatic view of a third embodiment of a network topology.

Referring now to FIG. 4, another example of a fixed user system 30" is illustrated. In this embodiment, the same elements from FIGS. 2 and 3 are provided with the same reference numerals. The local area network 120 may also include two servers 110A and 110B. Each server may include an optional display device 114A, 114B, respectively. In this embodiment a third client, Client C, is illustrated having a display 152 and a client device 154.

Figure 5:
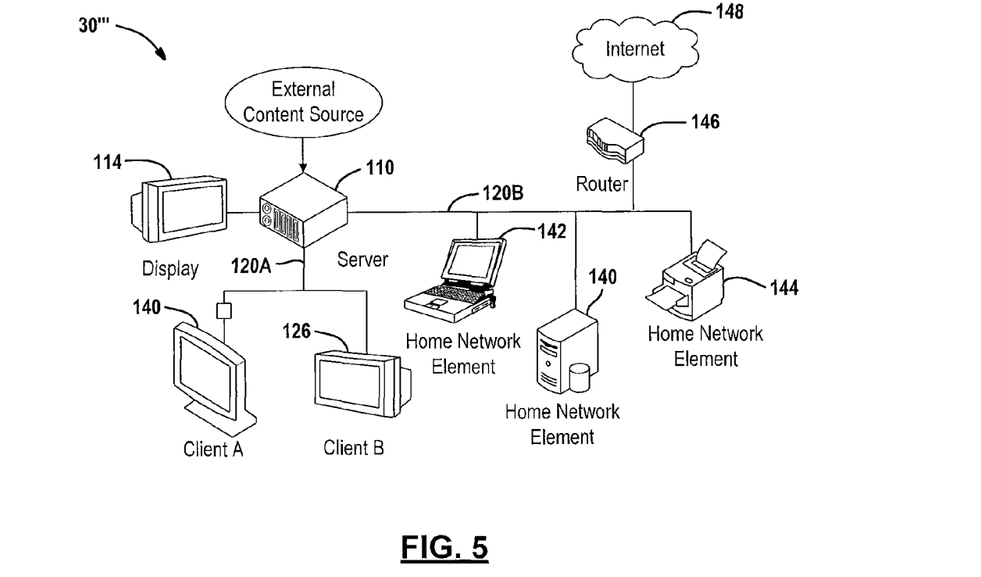
FIG. 5 is a block diagrammatic view of a fourth embodiment of a network topology.

Referring now to FIG. 5, providing customers with reliable service is important. A fourth example of the fixed user system 30''' is illustrated. In certain cases, a home network may not be as reliable as a direct connection. In FIG. 5, the local area network is divided into a first local area network 120A between the first client, Client A, the second client, Client B, and the server 110. That is, the server 110 communicates through the first local area network 120A with both Client A and Client B and any other clients that may be on the system. A second local area network 120B may communicate with other devices within the home network such as the computer 140, the laptop computer 142, the printer 144 and the router 146.

Figure 6:
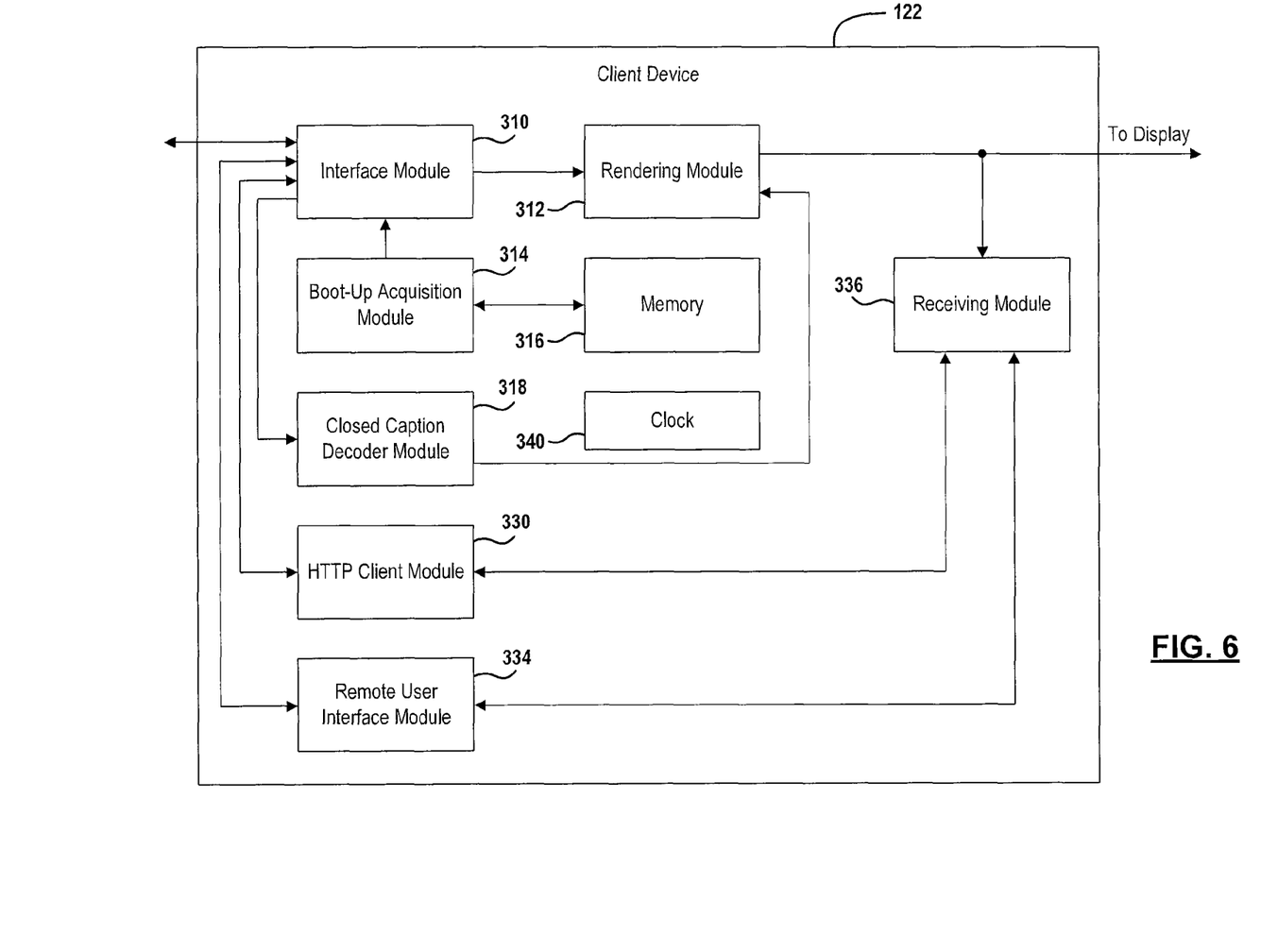
FIG. 6 is a simplified block diagrammatic view of a client device.

Referring now to FIG. 6, a client device 122 is illustrated in further detail. The client device may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate between a local area network and the server 110 illustrated in FIGS. 2-5. The client device 122 may also be incorporated into various types of devices such as a television, a video gaming system, a hand-held device such as a phone or personal media player, a computer, or any other type of device capable of being networked.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the local area network and the client device 122. As mentioned above, the client device 122 may be integrated within various types of devices or may be a standalone device. The interface module 310 may include a rendering module 312. The rendering module 312 receives formatted signals through the local area network that are to be displayed on the display. The rendering module 312 merely places pixels in locations as instructed by the formatted signals. By not including a decoder, the rendering module 312 will allow consistent customer experiences at various client devices. The rendering module 312 communicates rendered signals to the display of the device or an external display.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a make identifier, a model identifier, a hardware revision identifier, a major software revision, and a minor software revision identifier. Also, a download location for the server to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

A closed-caption decoder module 318 may also be included within the client device 122. The closed-caption decoder module 318 may be used to decode closed-captioning signals. The closed-captioning decoder module 318 may also be in communication with rendering module 312 so that the closed-captioning may be overlayed upon the rendered signals from the rendering module 312 when displayed upon the display associated with the client device.

Communications may take place using HTTP client module 330. The HTTP client module 330 may provide formatted HTTP signals to and from the interface module 310.

A remote user interface module 334 allows clients associated with the media server to communicate remote control commands and status to the server. The remote user interface module 334 may be in communication with the receiving module 336. The receiving module 336 may receive the signals from a remote control associated with the display and convert them to a form usable by the remote user interface module 334. The remote user interface module 334 allows the server to send graphics and audio and video to provide a full featured user interface within the client. Screen displays may be generated based on the signals from the server. Thus, the remote user interface module 334 may also receive data through the interface module 310. It should be noted that modules such as the rendering module 312 and the remote user interface module 334 may communicate and render both audio and visual signals.

A clock 340 may communicate with various devices within the system so that the signals and the communications between the server and client are synchronized and controlled.

Figure 7:
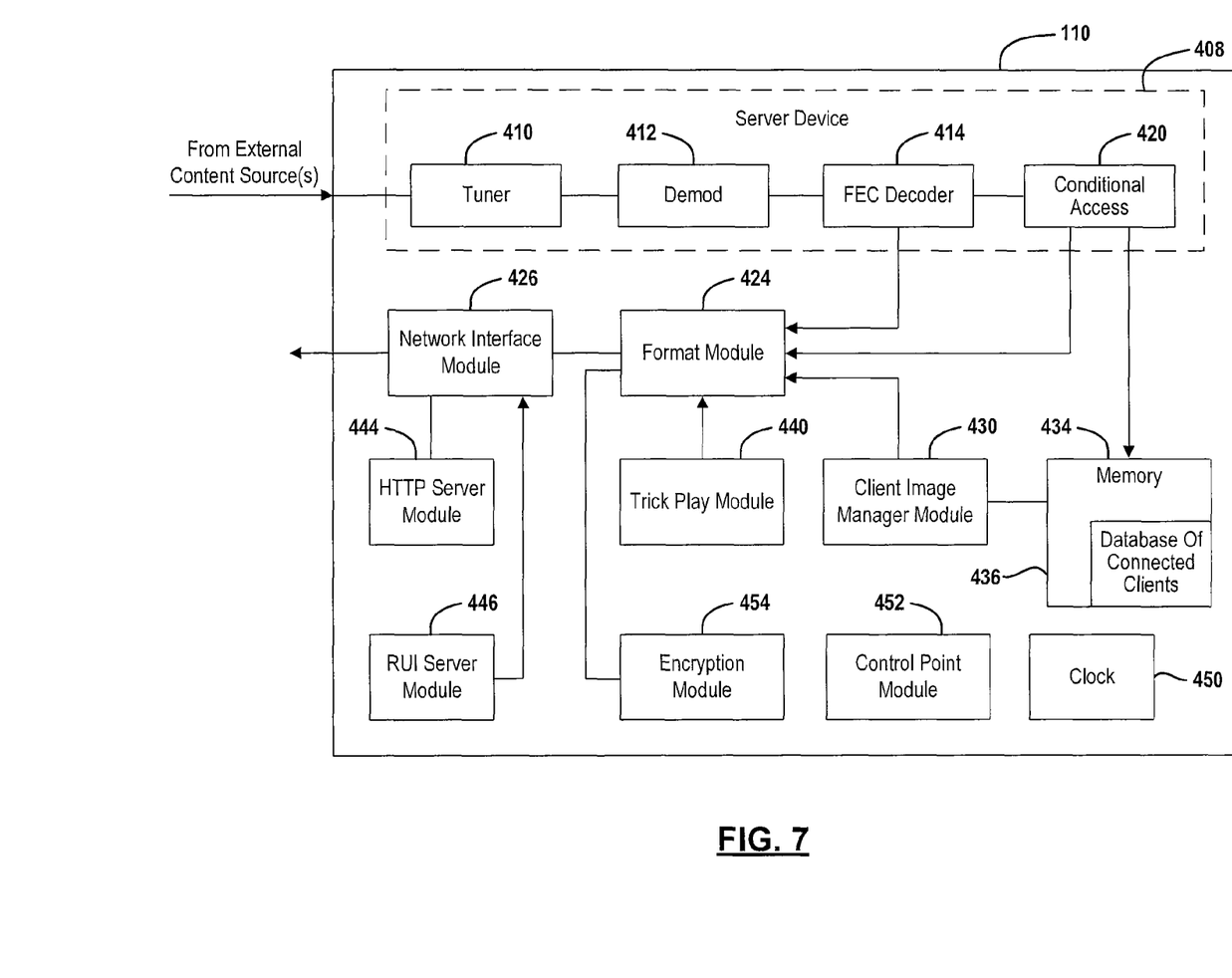
FIG. 7 is a block diagrammatic view of a server device.

Referring now to FIG. 7, a server 110 is illustrated in further detail. The server 110 is used for communicating with various client devices 122. The server 110, as mentioned above, may also be used for communicating directly with a display. The server 110 may be a standalone device or may be provided within another device. For example, the server 110 may be provided within or incorporated with a standard set top box. The server 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a tuner 410, a demodulator 412, a forward error correction decoder 414 and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate comments to control pixels at different locations of the display.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory may also contain other data such as a database of connected clients 436. The database of connected clients may also include the client image manager module data.

A trick play module 440 may also be included within the server device 110. The trick play module 440 may allow the server device 110 to provide renderable formatted signals from the format module 424 in a format to allow trick play such as rewinding, forwarding, skipping, and the like. An HTTP server module 444 may also be in communication with the network interface module 426. The HTTP server module 444 may allow the server device 110 to communicate with the local area network. Also, the HTTP server module may also allow the server device to communicate with external networks such as the Internet.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used to control and supervise the various functions provided above within the server device.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

An encryption module 454 may also by incorporated into the server device 110 for encrypting the output of the server 110. The encryption module 454 may also provide digital transmission content protection (DTCP) to copy protect content.

Figure 8:
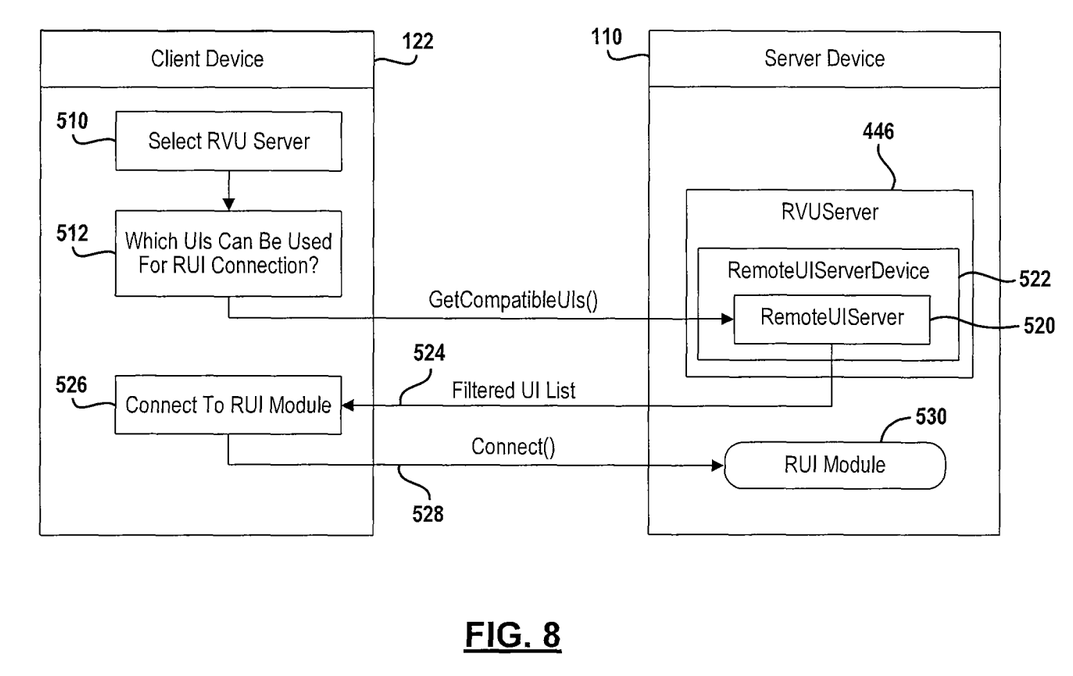
FIG. 8 is a sequence diagram of a session management flow to establish a remote user interface connection from the client to the server.

Referring now to FIG. 8, the remote user interface is the means for the client interaction with the server. The user interface look and feel is common for various users not only within the local area network but outside the local area network. The look and feel of the user interface does not require extensive custom user interface software to be placed within the client device. In FIG. 8, the client device 122 and the server device 110 establish a connection for the remote user interface. There may be a choice of several servers within the local area network. In step 510, the client device chooses the server device for connection. In step 512, the client queries which user interfaces can be used for a remote user interface (RUI) connection. A get compatible User Interface (UI) command may be communicated between the client device 122 using step 512. The get compatible UI command may be communicated to the remote UI server 520 which may be part of the remote UI server device 522 which, in turn, is part of the server 110. A filter user interface list may be generated at step 524. After step 524, a connection to the remote user interface module may be performed in step 526. A connection signal may be communicated in step 528 to connect to the remote user interface module 530.

When the client communicates with a server 110, the client may be restricted to communicate with only one server. A choice may be provided to the user of the client device 122 when such a condition occurs.

Figure 9:
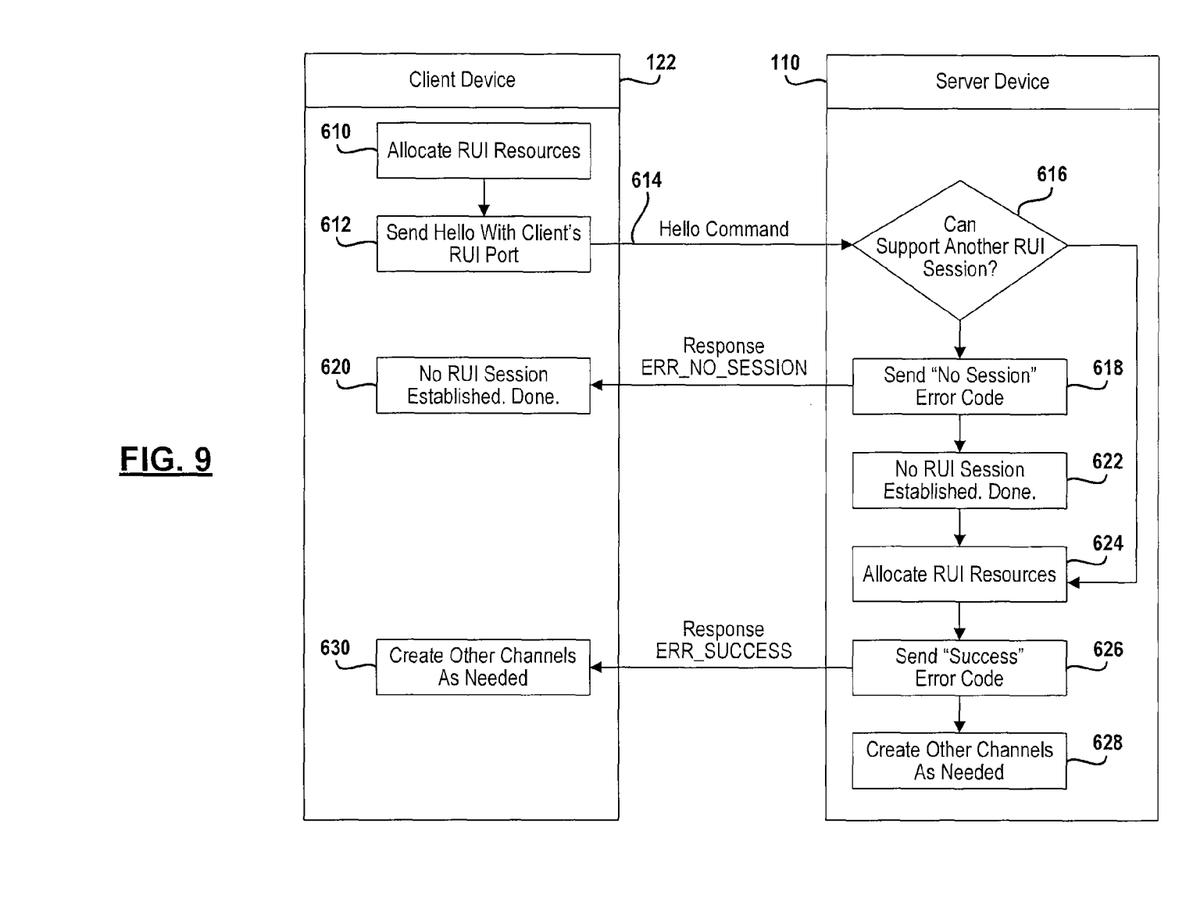
FIG. 9 is a start-up sequence for a remote user interface.

Referring now to FIG. 9, the remote user interface start-up sequence is set forth. The remote user interface allows a client of a media server to communicate remote control commands and a status to the server. It also allows the server device to send graphics and audio to provide a full featured user interface within the client. This allows the client devices to be manufactured with little customized user interface software and makes it possible for existing clients to be integrated into a local area network. The connection is initiated by a client device and one or more transmission control protocol streams referred to as channels may be established. Command channels provide an interface for the allowed remote user interface commands and data channels provide data needed to employ the remote user interface commands.

In FIG. 9, the client device 122 allocates remote user interface resources in step 610. This may allow certain memory and channels to be established. In step 612, a "hello" command or initiation command is provided through the remote user interface of the client device 122. Step 614 illustrates the "hello" command being transferred to the server device 110. In step 616, it is determined whether or not the remote user interface session can be supported at the server. If the remote user interface session cannot be supported, step 618 sends a "no session" error code (ERR_NO_Session) to the client device 122 and thus no remote user interface session is established and communication between the client device 122 and the server device 110 is terminated in step 620.

Referring back to step 616, when the remote user interface session can be supported by the server device 110, step 624 allocates remote user interface resources within the server device. This may reserve the memory and establish communication on the channel setup by the client device 122. After step 624, step 626 sends a success error code to the client device 122. Other channels are created in step 628 as needed in the server device 110. Also, after communication of the success code to the client device 122, the client device 122 may create other channels as needed.

Figure 10:
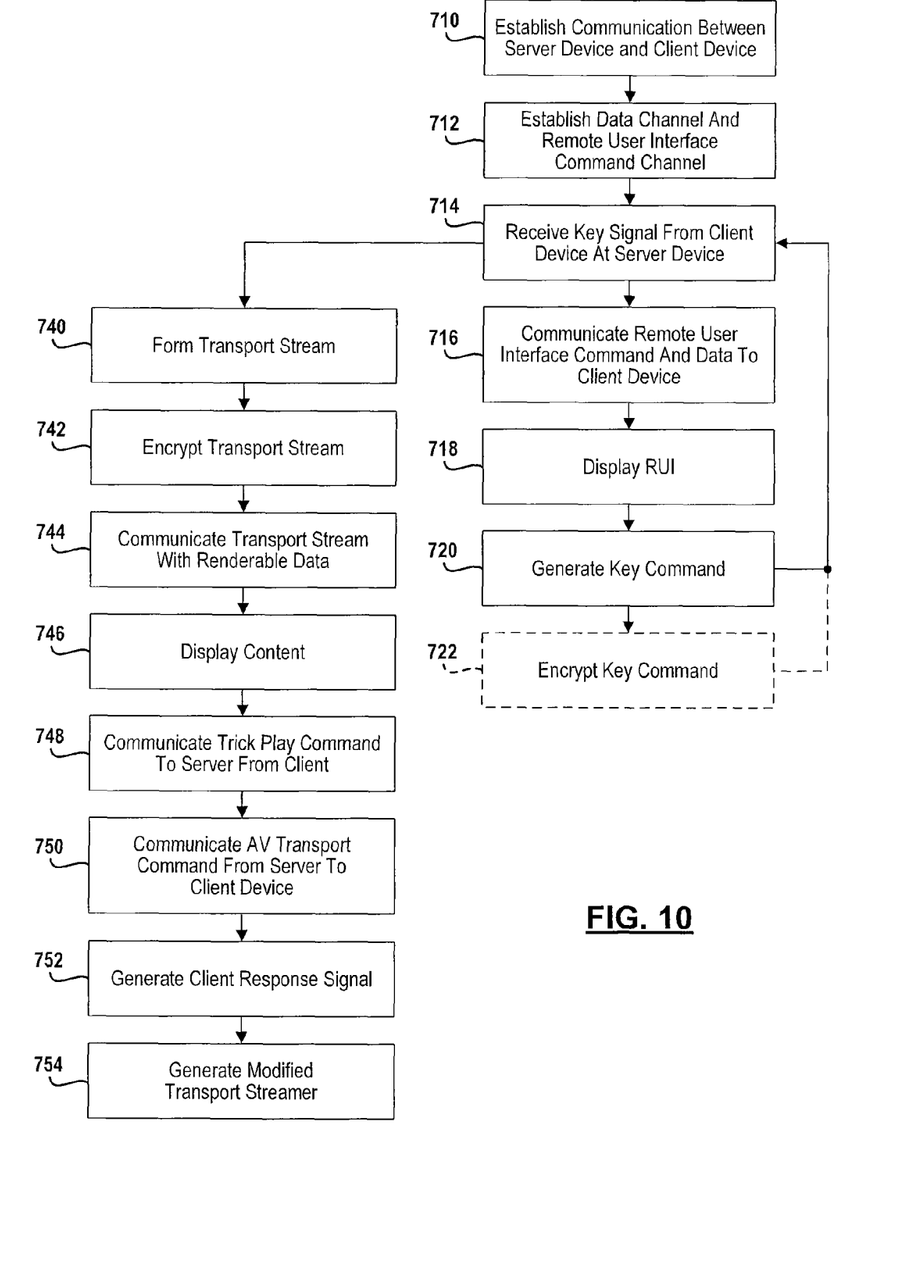
FIG. 10 is a flowchart of a method of generating client screen displays using a remote user interface according to the present disclosure.

Referring now to FIG. 10, a method for communicating remote user interface (RUI) commands and data between a client device 122 and a server device 110 is set forth. In step 710, a communication between the server device and the client device is established. This may be performed using the start-up sequence set forth in FIG. 9. In step 712, a data channel and a remote user interface command channel may be established during the start-up sequence.

In step 714, a key signal is generated from a key associated with the client device 122. The key signal may be generated by depressing a button associated with the remote control or on the client device itself. The key signal may be generated from a selection and thus may be referred to as a selection signal. In step 714, the key signal may correspond to a menu command that communicates the desire for a user to have the client device 122 display a particular menu. In step 716, the server device 110 may communicate a remote user interface command and data associated with the remote user interface command to the client device. The client device 122 may then display the remote user interface on the display associated with the remote user interface in step 718.

In step 720, a key command may be generated and communicated to the server device 110 from the client device 122. The key command may also be encrypted as illustrated by optional step 722. An encrypted key command may also be used to protect the privacy of various communication such as credit card information when ordering content, passwords, and the like. Once the key command is generated, step 714 may again be performed. This allows another remote user interface or changes to be communicated and displayed to the client device.

Referring now to step 714, the actions of the key signal may also be used for forming a transport stream for communicating live or stored content. For example, the memory of the server device may be used for storing various content. Pushing play on a remote control may generate a key signal corresponding to playing of a particular piece of content from the server and communicating the content to the client device using a transport stream. In step 740, a transport stream is formed with the content. In step 742, the transport stream may be encrypted by the encryption module 454 of FIG. 7.

In step 744, the transport stream is communicated with renderable data. In step 746, the content is displayed from the transport stream. As mentioned above, the client device may render the renderable data for display on the client device.

In step 748, trick play may also be supported between the client device 122 and the server device 110. In step 748, if a trick play key command signal is communicated from the client device 122 to the server 110, a trick play process may be performed. The trick play process may allow various trick play functions to be performed and include, but are not limited to, fast-forward scan, fast-rewind scan, slow-forward scan, frame step-forward and play normal. Of course, other types of trick plays may also be supported. When a trick play key command signal is communicated from the client device 122 to the server device 110, an audio-video (AV) transport command signal may be communicated from the server to the client. The audio-video transport command signal communicated in step 750 may generate a client response signal from the client device 122. Once the client device responds, a modified transport stream may be generated in step 754. The modified transport stream may thus correspond to the trick play desired by the client device. As mentioned above, the various key signal commands may be communicated using a remote user interface command channel, whereas the data within the remote user interface may be provided using a data channel. Audio-video signals may continually be provided during the process in a separate window or as the background of a remote user interface. It should be noted that, when communicating trick play or any streaming from the server device to the client device, DTCP copy link protection may be provided to secure all content.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
a first server device in communication with a first client device through a two-way command channel and a one-way data channel different than the command channel of a local area network,
said first server device receiving a broadcast signal from a broadcaster and generating an audio-video transport stream by demodulating and decoding the broadcasted signal;
wherein the first server device is responsive to a key command received through the command channel to provide the audio-video transport stream and remote user interface data, and the first server device is configured to communicate the audio-video transport stream and the remote user interface data to the first client device through the data channel of the local area network; and
wherein the first client device is configured to render a display using the audio-video transport stream and the remote user interface data, and the first client device is further configured to generate the key command and communicate the key command to the first server device through the command channel of the local area network.

2. A system as recited in claim 1 wherein the first client device is configured to communicate a remote user interface port number to the first server device, and the first server device is configured to communicate the remote user interface data to the client device using the remote user interface port number.

3. A system as recited in claim 1 further comprising a second client device in communication with the first server device, wherein the first server device is configured to provide second remote user interface data and communicate the second remote user interface data to the second client device through the local area network.

4. A system as recited in claim 1 further comprising a memory within the first server device storing content, wherein the first server device is configured to provide a first transport stream and a second transport stream based on the content and concurrently communicate the first transport stream and the second transport stream through the network.

5. A system as recited in claim 4 wherein the first server device is configured to receive satellite content via a satellite and store the satellite content within the memory.

6. A system as recited in claim 1 wherein the first server device is configured to receive internet content and communicate the internet content to the first client device through the local area network.

7. A system as recited in claim 1 further comprising a second server device in communication with the first client device through the network, wherein the first client device is configured to select a selected server device from the first server device and the second server device and receive the remote user interface data from the selected server device.

8. A system as recited in claim 1 wherein the first client device is configured to encrypt the key command.

9. A system as recited in claim 1 wherein the key command comprises a trick play command comprising one of a fast forward scan command, a fast rewind scan command, a slow forward scan command, a frame step forward command or a play normal command.

10. A system as recited in claim 9 wherein the first server device is configured to provide a modified transport stream based on the trick play command.

11. A system as recited in claim 10 wherein the first server device is configured to communicate a transport command signal to the first client device in response to the trick play command, and communicate the modified transport stream to the first client device after receipt of a client response signal from the first client device.

12. A system as recited in claim 1 wherein the first server device is configured to generate renderable signals using the remote user interface data that have instructions for displaying pixels in pixel locations on a display associated with the first client device and the first client device is configured to render the renderable signals on the display associated with the first client device.

13. A method of communicating between one or more client devices and one or more server devices on a local area network comprising:
    receiving a broadcast signal from a broadcaster at a first server device;
    generating an audio-video transport stream by demodulating and decoding the broadcasted signal;
    on a local area network, providing a two-way command channel and a one-way data channel different than the command channel between the first server device and a first client device;
    the first server device communicating an audio-video transport stream and remote user interface data to the first client device through the data channel of the local area network;
    the first client device rendering a display using the audio-video stream and the remote user interface data;
    providing a key command at the first client device; and
    communicating the key command through the command channel of the local area network to the first server device in response to the remote user interface data.

14. A method as recited in claim 13 further comprising:
    communicating a remote user interface port number to the first server device from the first client device; and
    communicating the remote user interface data from the first server device to the first client device using the remote user interface port number.

15. A method as recited in claim 13, further comprising:
    providing second remote user interface data at the first server device; and
    communicating the second remote user interface data to a second client device from the first server device through the local area network.

16. A method as recited in claim 13 further comprising:
    storing content in a memory within the first server device;
    providing a first transport stream and a second transport stream at the first server device based on the content; and
    communicating the first transport stream and the second transport stream simultaneously through the network.

17. A method as recited in claim 13 further comprising:
    the first server device receiving satellite content from a satellite; and
    storing the satellite content within a memory.

18. A method as recited in claim 13 further comprising:
    receiving internet content at the first server device; and
    communicating the internet content to the first client device.

19. A method as recited in claim 13 further comprising:
    the first client device selecting the first server device from a plurality of available server devices.

20. A method as recited in claim 13 further comprising encrypting the key command at the first client device.

21. A method as recited in claim 13 wherein providing the key command comprises providing a trick play command comprising one of a fast forward scan command, a fast rewind scan command, a slow forward scan command, a frame step forward command or a play normal command.

22. A method as recited in claim 21 further comprising the first server device providing a modified transport stream based on the trick play command.

23. A method as recited in claim 22 further comprising:
    the first server device communicating a transport command signal to the first client device in response to the trick play command; and
    the first server device communicating the modified transport stream to the first client device after receipt of a client response signal from the first client device.

24. A method as recited in claim 13 further comprising:
    the first server device generating renderable signals having instructions for displaying pixels in pixel locations of a display associated with the first client device; and
    the first client device rendering the renderable signals on the display associated with the first client device.

* * * * *